May 1, 1956 C. BAUER 2,743,549
CROP DUSTING MACHINES
Filed June 20, 1952 4 Sheets-Sheet 1
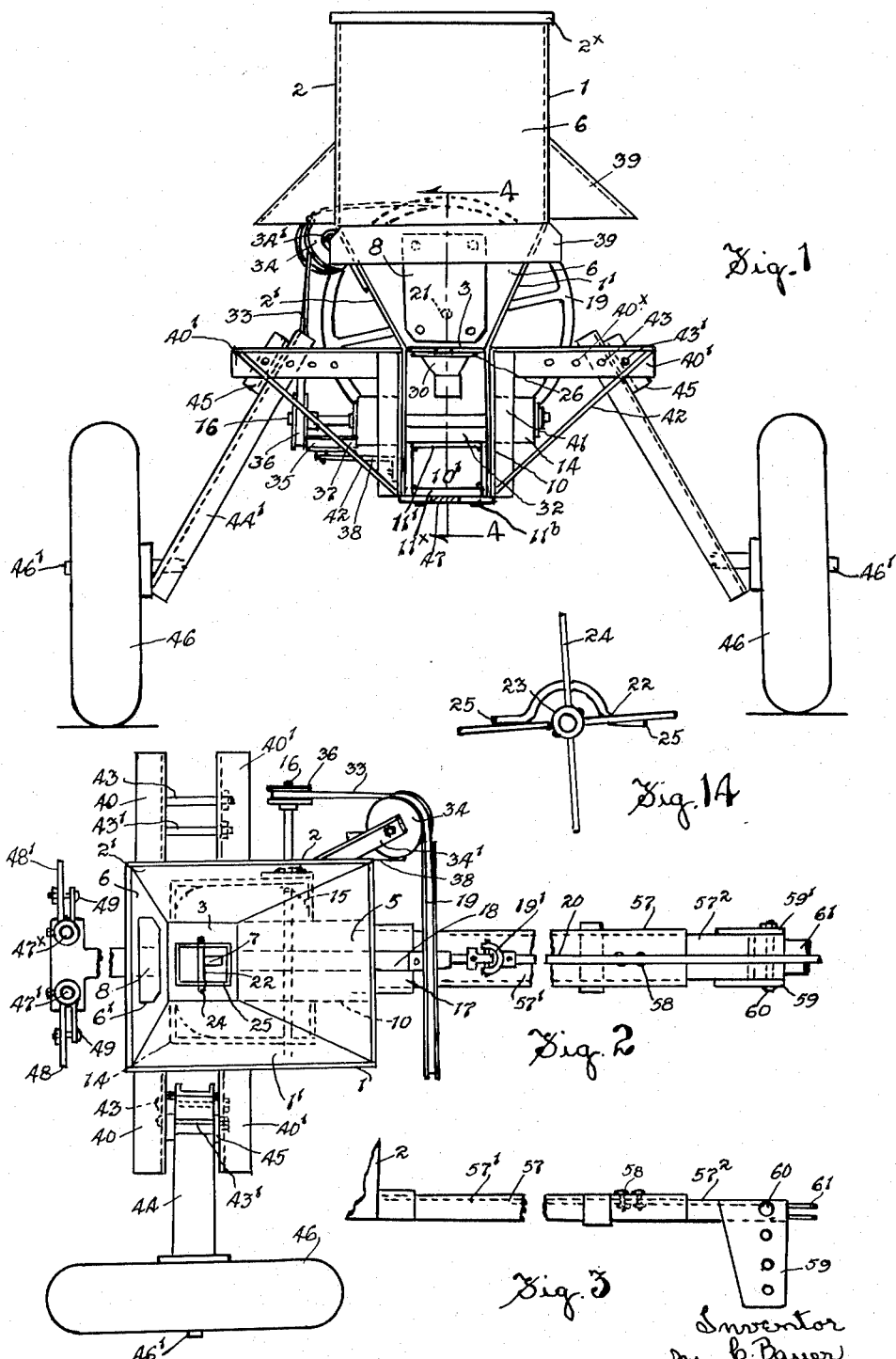

May 1, 1956  C. BAUER  2,743,549
CROP DUSTING MACHINES
Filed June 20, 1952  4 Sheets-Sheet 2

Inventor
C. Bauer
By J. S. Roxburgh
His atty

May 1, 1956  C. BAUER  2,743,549
CROP DUSTING MACHINES
Filed June 20, 1952  4 Sheets-Sheet 3
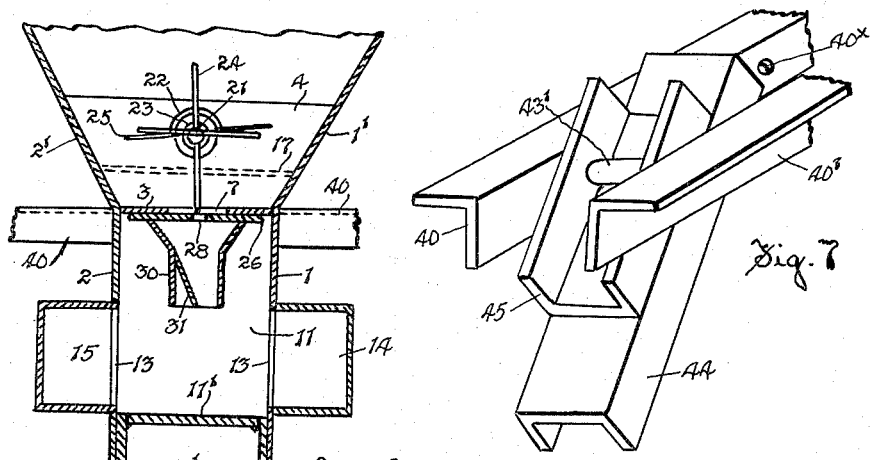
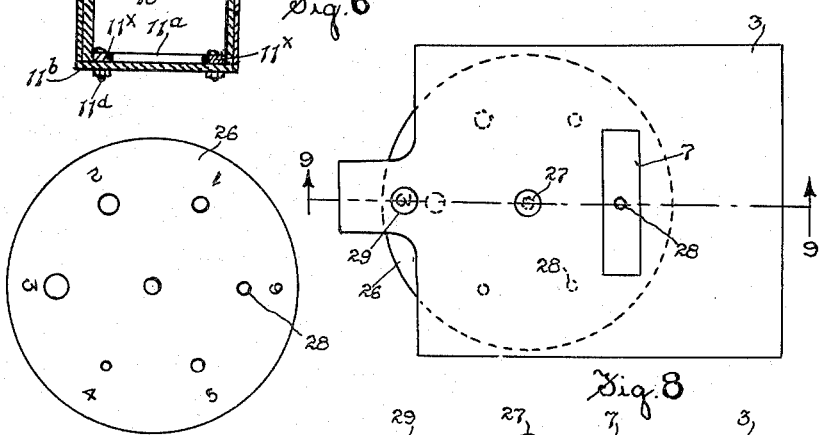
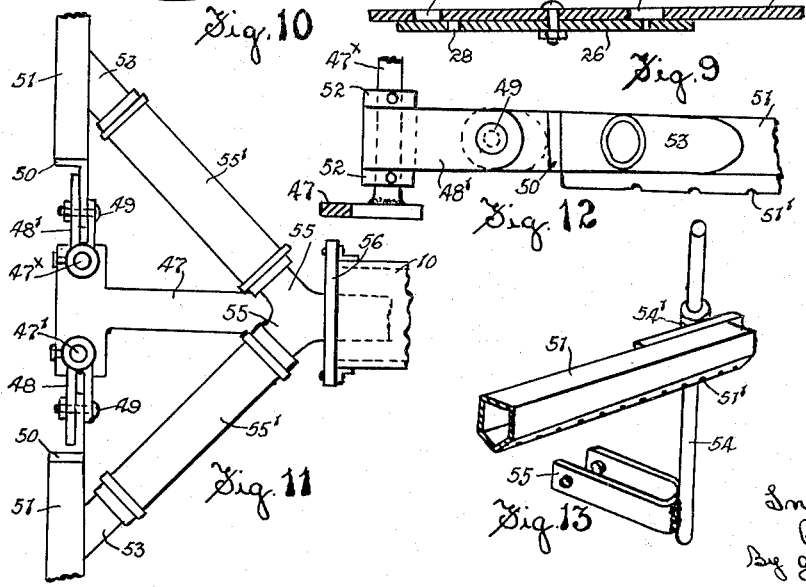

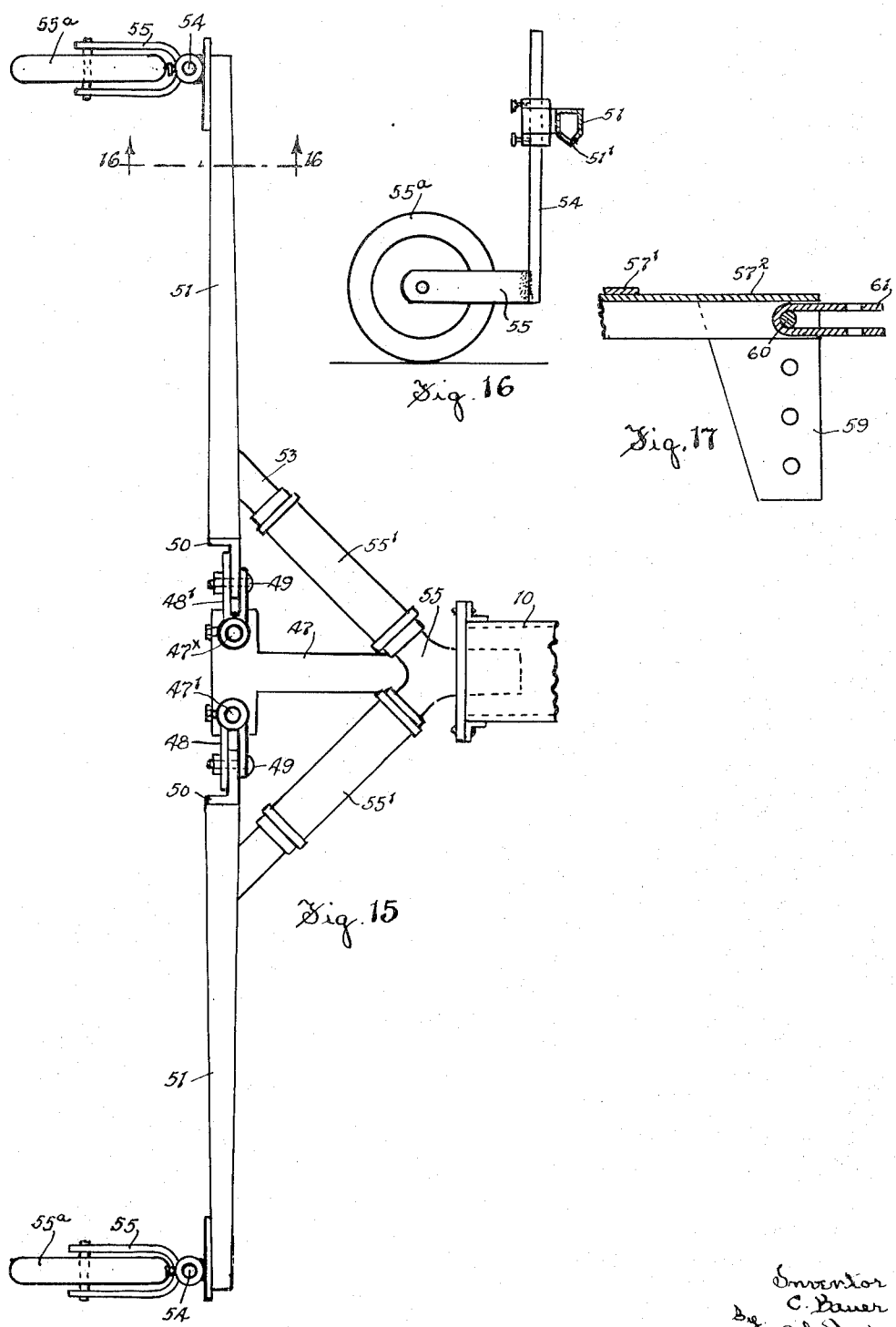

United States Patent Office 2,743,549
Patented May 1, 1956

2,743,549

CROP DUSTING MACHINES

Carl Bauer, Winnipeg, Manitoba, Canada

Application June 20, 1952, Serial No. 294,750

8 Claims. (Cl. 43—148)

The invention relates to crop dusting machines and an object of the invention is to provide a cheap and efficient, two wheeled trailer-like machine which can be hitched to a tractor and which has its working parts so arranged that they can be and are driven by the power take-off shaft of the tractor and with the hitching and driving parts such that they can accommodate the tractor hitch and power takeoff shaft of the tractor.

A further object is to construct the body of the machine from sturdy metallic plates welded together to withstand rough usage and which are so arranged that the welding operations can be easily performed and further to supply well spread legs adjustably and effectively secured to the machine body and fitted with ground wheels supporting the machine body.

A further object is to form a fan or blower casing with a rear outlet or discharge duct by welding a preshaped plate to the side plates of the machine and to supply a suitably mounted fan within the casing.

A further object is to supply the machine with a rearwardly disposed dust receiving hopper of good capacity and which feeds the dust to a transverse slot provided in the bottom of the hopper and to supply a rotary disc under the hopper bottom provided with a plurality of varying sized feed control holes any one of which can be brought, selectively, in the turning of the disc to a position centrally underlying the hopper slot.

A further object is to supply the disc with numbers designating the size of the holes therein and which holes in the rotation of the disc can be brought selectively to a position to be seen through a sight opening provided in a fixed plate overlying the disc and extending from the hopper and with the arrangement of the numbers such that the number viewed at the sight opening indicates the size of the feed control hole underlying the hopper outlet slot.

A further object is to supply the machine with a chute adapted to direct dust gravitating from the hopper through the selected disc hole, centrally into a mixing chamber positioned to the rear of the fan casing and above the outlet duct, to provide a baffle plate controlling the inlet of atmospheric air to such chamber, and to supply ducts leading from the sides of the mixing chamber to the opposite sides of the fan casing.

A further object is to supply an agitator driven by the power take-off shaft of the tractor to which the machine is hitched and which agitator presents paddles adapted to sweep over the upper face of the disc at the hopper outlet slot and an open frame which combines with the paddles to insure the positive feeding of the dust to the outlet slot.

A further object is to provide the machine, rearwardly, with normally outstanding booms, for directing the dust discharged from the outlet duct onto the field to be treated and to mount the ends of the booms so that they can be raised or lowered as desired, the outer ends of the booms being carried by castor wheels, and being normally held in their outstanding positions by tie lines supplied.

With the above more important objects and other minor objects in view and which latter will become apparent as the description proceeds, the invention consists essentially in the arrangement and construction of parts hereinafter described, reference being had to the accompanying drawings in which:

Fig. 1 is a rear view of the machine, the booms and boom connections being omitted.

Fig. 2 is a plan view of the machine, the hopper lid and hoods having been removed, and one side leg having been omitted as has also a ground wheel.

Fig. 3 is a side view of the draw bar as it appears in Fig. 1.

Fig. 6 is a vertical cross sectional view at 6—6 Fig. 4.

Fig. 7 is a perspective view showing how the side legs are secured to the outstanding pairs of side arms.

Fig. 8 is an enlarged detailed plan view of the bottom plate of the hopper and showing the underlying feed control disc.

Fig. 9 is a vertical sectional view at 9—9 Fig. 8.

Fig. 10 is a plan view of the feed control disc.

Fig. 11 is a plan view of the inner ends of the booms and of the connections between the inner ends of the booms and the discharge outlet from the fan casing. In this view the adjusting collars have been omitted.

Fig. 12 is a face view, looking rearwardly, of the inner end of one of the booms and showing its connection to the T-shaped bar.

Fig. 13 is a perspective view of the outer end of one of the booms and showing the vertical spindle associated therewith and the forks at the lower end of the spindle. In this view the adjusting collars have been omitted as has also the ground wheel mounted between the forks.

Fig. 14 is an enlarged end view of the agitator, the near end having been broken away.

Fig. 15 is a plan view of the rear end of the machine and showing the booms and the outer land wheels supporting the same.

Fig. 16 is a vertical sectional view at 16—16 Fig. 15 and looking in the direction of the applied arrow.

Fig. 17 is an enlarged vertical sectional view, centrally and longitudinally through the forward end of the draw beam and showing particularly the clevis.

In the drawings like characters of reference indicate corresponding parts in the several figures.

Figure 4:
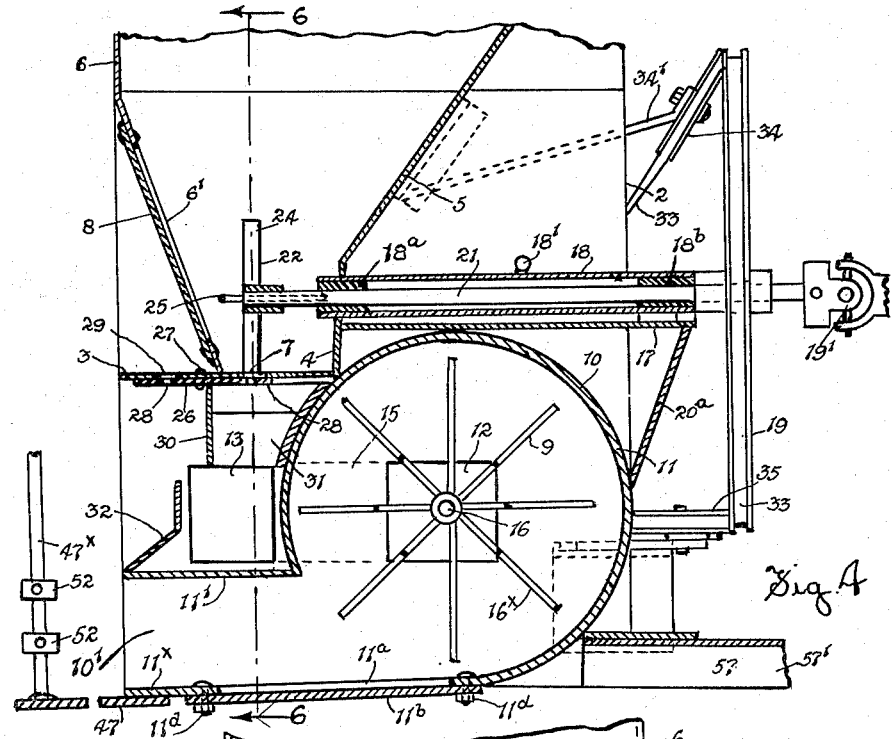
Fig. 4 is an enlarged vertical sectional view at 4—4 Fig. 1.
Figure 5:
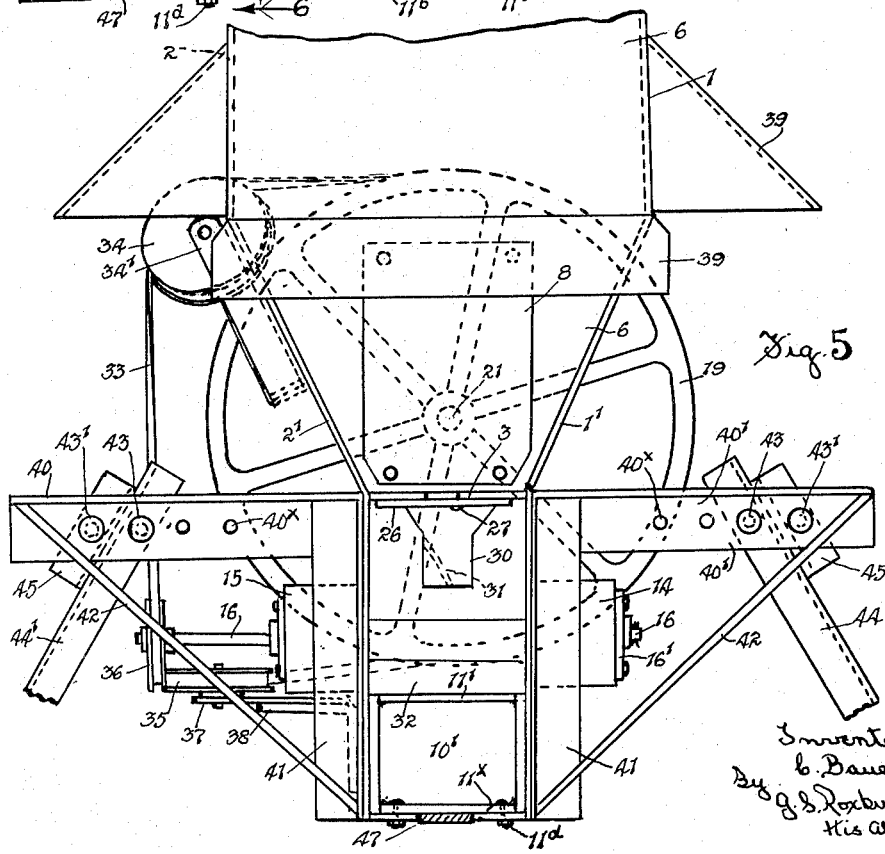
Fig. 5 is an enlarged rear view of the body of the machine.

In constructing my dusting machine, I use a pair of spaced, similar, upstanding side plates 1 and 2 which present upper and lower portions interconnected by downwardly converging parts 1' and 2', the upper portions and those parts 1' and 2' actually forming the sides of the hopper. Rearwardly between the side plates and welded thereto at approximately the points of their upper bends I introduce a horizontally disposed rear plate 3 which extends forwardly a fixed distance and has a vertical transverse plate 4 welded thereto, the ends of the plate 4 being cut at an angle and welded to the parts 1' and 2'. The plate 4 rises a fixed distance and has an upgoing plate 5 welded thereto and to the side plates and which forms the front of the hopper. A rear, upgoing, cross plate 6 is welded to the plate 3 and to the sides 1 and 2 and forms the rear of the hopper. In other words the side plates and the plates 3, 4, 5 and 6 provide a hopper the upper part of which is substantially rectangular and of good capacity and the lower part of which slopes inwardly, on all sides, to the plate 3 and feeds to an outlet slot 7 which passes crosswise of the hopper, and is cut in the latter plate. A lid 2$^x$ is supplied to close the top of the hopper.

In order to give entrance to the lower part of the hopper, the inclined lower end of the plate 6 is provided with an opening 6' normally closed by a removable cover plate 8.

The body of the machine embodies also a fan or blower 9, a fan casing 10 and a discharge or outlet duct 10' from the casing, and the fan casing is formed by inserting a curved plate 11 between the lower portions of the side plates and welding its edges thereto and the duct is made by extending the ends 11' and 11$^x$ of plate 11 and welding their edges to the side plates. To permit entrance to the casing, the under part 11$^x$ is supplied with a large opening 11$^a$ normally closed by a removable plate 11$^b$ secured by suitable bolts 11$^d$ to the wall 11$^x$.

Similar openings 12 and 13 are cut in the side plates and the openings in each plate are interconnected by similar side ducts 14 and 15 which are made by welding plates together in a box like formation and welding the open side of the box to the side plates. The openings 12 are positioned centrally in the sides of the casing and the openings 13 are formed in the lower portions of the side plates, immediately to the rear of the casing and directly above the outlet duct 10', and underlying the slot of the plate 3.

The fan shaft 16 passes transversely through the openings 12 and is carried by suitable bearing plates 16' secured to the outer sides of the ducts 14 and 15. The shaft carries a fan formed from a number of similar blades 16$^x$ which operate within the fan casing.

In a location above the fan casing I locate a fixed front plate 17 which has its edges welded to the side plates, its inner end welded to the plate 4 and its front end extending forwardly beyond the side plates. The said plate 17 supports centrally, a fixed tube or pipe 18 the rear end of which protrudes through the plate 4 a short distance (see Fig. 4) and the tube contains bushings 18' and 18$^a$ forming bearings for an upper shaft 21, the rear end of which terminates in the lower part of the hopper in a location centrally crossing and above the slot 7 and the front end of which is supplied with a relatively large drive pulley 19 and terminates in a universal joint 19' connecting it with a drive shaft 20 for connecting up with the power take off shaft of the tractor to which the machine is hitched. The open area between the tube and shaft receives grease for shaft lubricating purposes and which is injected through a nipple 18'. The front end of the tube is reinforced by a brace bar 20$^a$ extending downwardly to the plate 11.

On the rear end of the shaft 21 I mount a rotary agitator generally indicated by the number 22 and which embodies a hub 23 secured to the shaft, similar radial paddles 24 secured to the hub and an open frame 25 secured to a pair of the paddles. The agitator operates in the contracted lower end of the hopper and has the paddles designed such that in their rotation with the shaft 21 their tips enter the slot 7 and sweep across the upper face of the disc 26 directly underlying the plate 3 the said disc and plate members being secured by a central pivot pin 27. The disc is supplied with a number of concentrically positioned, spaced, feed openings 28 which can be brought, selectively, in the rotation of the disc, to a central position within the slot 7. The openings 28 vary in diameter as will best be seen by observing Fig. 10 and in order that the machine attendant may control the feed of dust from the hopper I have put identifying numbers on the upper face of the disc which in the manual rotation of the disc become visible through a sight opening 29 provided in the rear of the plate 3. The numbers are so arranged that when say the number 1 is visible through the sight opening, the smallest feed opening in the disc is positioned centrally underlying the slot 7 and that when the number 2 is visible through the sight opening the next sized hole 28 is at the slot 7 and so forth for the rest of the identifying numbers and feed holes 28. An additional disc can be supplied with a further range of feed openings so that a wide control of feed can be obtained to suit crop conditions.

Directly under the disc and suitably secured to the casing plate 11 is a chute 30 which has an internal deflector 31 adapted to discharge the dust gravitating from the feed opening into the open area between the opposing openings 13 leading to the ducts 14 and 15. A baffle plate 32 extends upwardly from the outlet duct and crosses between the side plates 1 and 2 in a location just to the rear of the openings 13 (see Fig. 4).

It will be here observed that the baffle plate 32, the opposing, rear part of the fan casing, the side plates 1 and 2 and the end 11' of the plate 11 all form a dust receiving chamber located directly and centrally under the outlet from the hopper and into which atmospheric air is admitted over the baffle plate and from which it is led through the side ducts 14 and 15 to the interior of the fan casing.

The pulley 19 is utilized to drive the fan or blower and to this end is supplied with an endless belt 33 which passes over upper and lower idler pulleys 34 and 35 and to and around a small driving pulley 36 secured to the extended end of the shaft 16. The upper idler pulley is mounted on a supporting bar 34' secured in an angular position to the outflaring part 2' of plate 2 and the lower idler pulley is mounted in a horizontal position on a bar 37 secured in an angular position to a supporting bracket 38 welded to the lower part of the member 2'.

The hopper is supplied with suitable hoods 39 to protect the underlying parts from the weather.

Similar pairs of spaced, equi-length arms, in the form of angle irons 40 and 40' extend outwardly from the side plates in a location approximately aligned with the internal plate 3 and they have their inner ends welded to the side plates and to the upper ends of vertical angle irons 41 also welded to the side plates and reinforcing the latter. The vertical flanges of the arms 40 and 40' are provided with opposing, spaced, adjusting holes 40$^x$ which receive pairs of bolts 43 and 43' utilized to fasten the angularly disposed side legs 44 and 44' to the arms. Each side leg is in the form of a channel iron of predetermined length and to its upper end I have welded a short length of channel bar 45, the channel bars being placed back to back as shown. The bolt holes 40$^x$ are so spaced that the bolts 43 and 43' can be passed through registering bolt holes in the flanges of the channel bars with the result that the legs are firmly secured to the side arms by the entered bolts. The lower ends of the legs are supplied with short stub axles 46' on which the ground wheels 46 are mounted and obviously the ground wheels can be spread or moved in by adjusting at the bolts 43 and 43'.

To the underside of the outlet duct 10' I weld the forward end of a T-shaped bar 47 and the bar is supplied with a pair of upstanding posts 47$^x$ and 47' welded thereto. Similar hinge wings 48 and 48' are pivotally mounted on the posts and such carry bolts 49 pivotally connecting angle plates 50 to the wings and the angle plates are welded to the inner ends of similar, outstanding dust distributing booms 51. Collars 52 are adjustably mounted on the posts above and below the hinge wings to permit the inner ends of the booms to be raised or lowered in respect to the ground. The booms are of usual construction gradually decreasing in cross sectional area from their inner to their outer ends and they are supplied in their undersides with small, spaced, outlet holes 51'.

The outer end of each boom is supplied with a fixed vertical sleeve 54' (see Fig. 13) which pivotally receives a vertical spindle 54 having a fork 55 welded to the lower end thereof. Between the forks I mount land wheels and the spindles are supplied with collars identical to those 52 which are positioned above and below the sleeve. These land wheels have not been shown in the drawings as such are commonly employed and their mounting in forks is quite a common structure and as the collars associated with the spindles 54 are the same as those 52 and they function the same as such, they have also been omitted in the drawings. There sole purpose is to allow of the adjustment of the spindles 54 and the consequent setting of the outer ends of the booms in relation to the ground.

Each boom is supplied with an angularly disposed inlet pipe 53 adjacent its inner end and a length of flexible hose 55' connects the inlet pipe with a short outlet pipe 55 extending angularly from a plate 56 which crosses and closes the rear end of the duct 10'.

The machine is provided forwardly with an adjustable draw beam 57 for hitching it to the tractor draw bar. This draw beam is formed from a rear channel iron 57' welded to the side plates and to the underside of the plate 11 and which slidably receives a second, forward channel iron 57² adjustably secured to the rear channel iron by bolts 58. Opposing side plates 59 and 59' are welded to the forward end of the channel iron 57² and are supplied with opposing holes 57ˣ to receive a bolt 60 carrying a clevis 61 for attachment to the tractor draw bar.

When the machine is in use the draw beam is hitched to the draw bar of the tractor and the shaft 20 is connected up with the power take off of the tractor. The wheels 46 can be set to suit field requirements as can also the booms in their relation to existing crop conditions. The chemical or treating dust is put in the hopper which has considerable capacity. As the machine proceeds over the field the crop is treated by the chemical discharged through the small holes in the underside of the boom and here it will be observed that the amount of dust discharging from the booms is positively controlled by the size of hole which is set in registration with the slot 7. As the machine proceeds over the field the fan and agitator are both being driven, the fan discharging rearwardly through the duct 10' and the agitator agitating the dust in the lower end of the hopper and at the same time sweeping across the upper face of the disc to prevent any clogging at the feed hole. The fan causes an inflow of atmospheric air at high velocity over the baffle plate 32 and into what might be termed a mixing chamber confined in the area between the rear openings 13 to the ducts 14 and 15. The ingoing air is violently circulated in this area and carries in suspension, the dust gravitating through the chute and discharging centrally into such circulating air, with the net result that the dust ladened air passing to the side ducts 14 and 15 is evenly divided and becomes evenly distributed to the booms for a deposit on the crop.

What I claim as my invention is:

1. In a crop dusting machine, in combination, a fan casing having a rearwardly directed outlet duct, a driven fan within the casing, a dust receiving hopper having the bottom thereof provided with a discharge outlet, a chamber underlying the outlet into which discharging dust is centrally gravitated, said chamber having a restricted, rear inlet for atmospheric air and similar opposing air ducts leading from the opposite sides of the chamber and opening centrally through the sides of the fan casing.

2. The device as claimed in claim 1 wherein a movable plate is located beneath the hopper bottom and is supplied with a plurality of varying sized feed openings which in the movement of the plate can be brought selectively to a position underlying the discharge outlet from the the hopper.

3. The device as claimed in claim 1 wherein a feed control disc is pivotally secured to the hopper bottom and is provided with a plurality of concentrically positioned and spaced outlet openings adapted to be brought, in the turning of the disc, selectively to a position underlying the discharge outlet from the hopper.

4. The device as claimed in claim 1 wherein the outlet from the hopper is in the form of a transverse slot, a pivoted disc underlies the hopper bottom and is provided with a plurality of spaced, concentrically positioned, varying sized feed control holes adapted in the rotation of the disc to be brought selectively into a central position underlying the opening from the hopper and a driven agitator is rotatably mounted in the lower part of the hopper and presents paddles, the tips of which are adapted to enter the slot and sweep across the upper face of the disc.

5. The device as claimed in claim 4 wherein the agitator presents an open frame for agitating material gravitating within the hopper.

6. The device as claimed in claim 3 wherein the rearwardly extended hopper bottom is provided with a sight opening overlying the disc and the disc is provided with notations identifying the feed openings therein which are successively brought to a position underlying the outlet from the hopper.

7. In a crop dusting machine, in combination, a fan casing having a rearwardly directed outlet duct, an elevated dust receiving hopper to the rear of the casing and above the outlet, said hopper having the bottom thereof provided with means for controlling, gravitating dust discharge from the hopper and in variable quantity, a confined mixing chamber underlying the hopper bottom into which gravitating dust gravitates, said chamber being open rearwardly to atmosphere, and opposing side ducts leading from the sides of the mixing chamber and communicating with the interior of the fan casing centrally through the sides thereof.

8. In a crop dusting machine, in combination, a fan casing having a rearwardly directed outlet duct, an elevated dust receiving hopper to the rear of the casing and above the outlet therefrom, said hopper having the bottom thereof provided with means for gravitating dust discharge from the hopper and in variable quantity, a confined mixing chamber underlying the hopper bottom and presenting a rear baffle plate controlling the entrance of atmospheric air to the mixing chamber, a chute receiving dust gravitating from the hopper and discharging said dust centrally into the mixing chamber and side ducts leading from the sides of the mixing chamber and opening centrally through the sides of the fan casing to the interior of the latter.

References Cited in the file of this patent

UNITED STATES PATENTS

| Number | Name | Date |
|---|---|---|
| 820,779 | Guy | May 15, 1906 |
| 1,710,122 | Sorenson | Apr. 23, 1929 |
| 2,062,294 | Cary et al. | Dec. 1, 1936 |
| 2,220,082 | Daugherty | Nov. 5, 1940 |
| 2,253,802 | Ness et al. | Aug. 26, 1941 |
| 2,318,802 | Reid | May 11, 1943 |
| 2,425,419 | Carnes | Aug. 12, 1947 |
| 2,482,723 | Wallace | Sept. 20, 1949 |
| 2,604,332 | Kent | July 22, 1952 |